United States Patent [19]

Inada

[11] Patent Number: 5,450,583
[45] Date of Patent: Sep. 12, 1995

[54] OBJECT-ORIENTED LANGUAGE PROCESSING SYSTEM

[75] Inventor: Yutaka Inada, Kawasaki, Japan

[73] Assignee: Fujitsu Limited, Kawasaki, Japan

[21] Appl. No.: 902,579

[22] Filed: Jun. 22, 1992

[30] Foreign Application Priority Data

Jun. 20, 1991 [JP] Japan ................................. 3-147751

[51] Int. Cl.[6] .................... G06F 13/00; G06F 15/40
[52] U.S. Cl. ......................... 395/650; 395/200;
395/700; 395/500; 395/200.01; 364/DIG. 1;
364/284.3; 364/229.2; 364/229; 364/252.4;
364/283.1; 364/254.7; 364/256.8
[58] Field of Search .................. 395/200, 700–800,
395/600, 650, 100; 364/DIG. 1

[56] References Cited

U.S. PATENT DOCUMENTS

| | | | |
|---|---|---|---|
| 5,095,522 | 3/1992 | Fujita et al. | 395/200 |
| 5,133,075 | 7/1992 | Risch | 395/800 |
| 5,280,610 | 1/1994 | Travis, Jr. et al. | 395/600 |
| 5,297,284 | 3/1994 | Jones et al. | 395/700 |
| 5,313,629 | 5/1994 | Abraham et al. | 395/600 |

*Primary Examiner*—Kevin A. Kriess
*Assistant Examiner*—Majid A. Banankhah
*Attorney, Agent, or Firm*—Staas & Halsey

[57] ABSTRACT

A method for realizing an object-oriented language interface. A server process is performed for operating an object written in a first object-oriented language, and a client process is performed for operating another object written in a second object-oriented language. The object operated in the server process is utilized by the client process by performing a communication process through a communications path between the server process and the client process. The server process operates a server class written in the first object-oriented language and operates a communications manager for managing communications with the client process. The client process operates a virtual server class for defining a method corresponding to a method defined in the server class to utilize the method defined in the server class. The client process also operates an object correspondence table for storing correspondence information between the object operated in the server process and the object operated in the client process, and operates a communications manager for managing the communications with the server process.

12 Claims, 10 Drawing Sheets

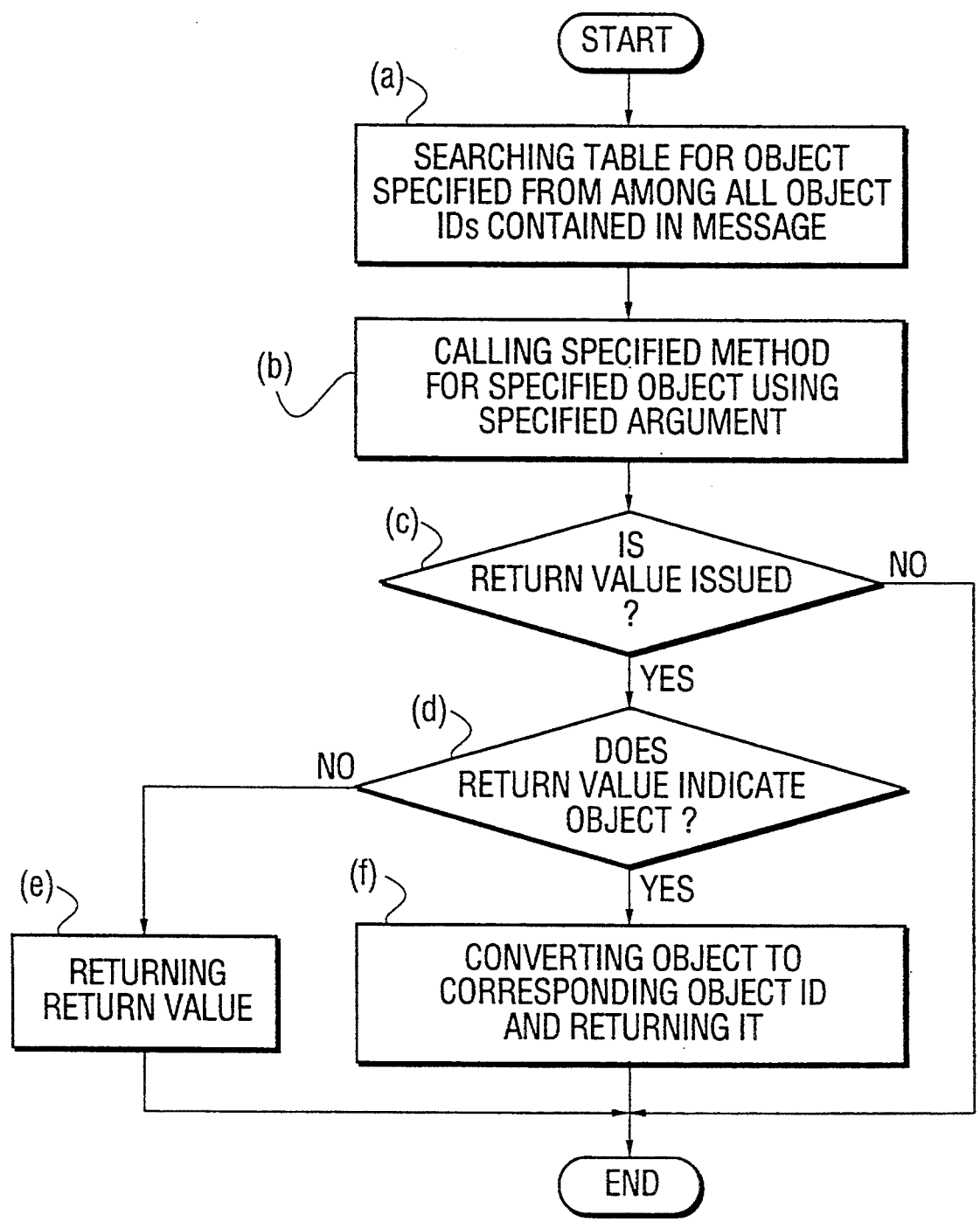

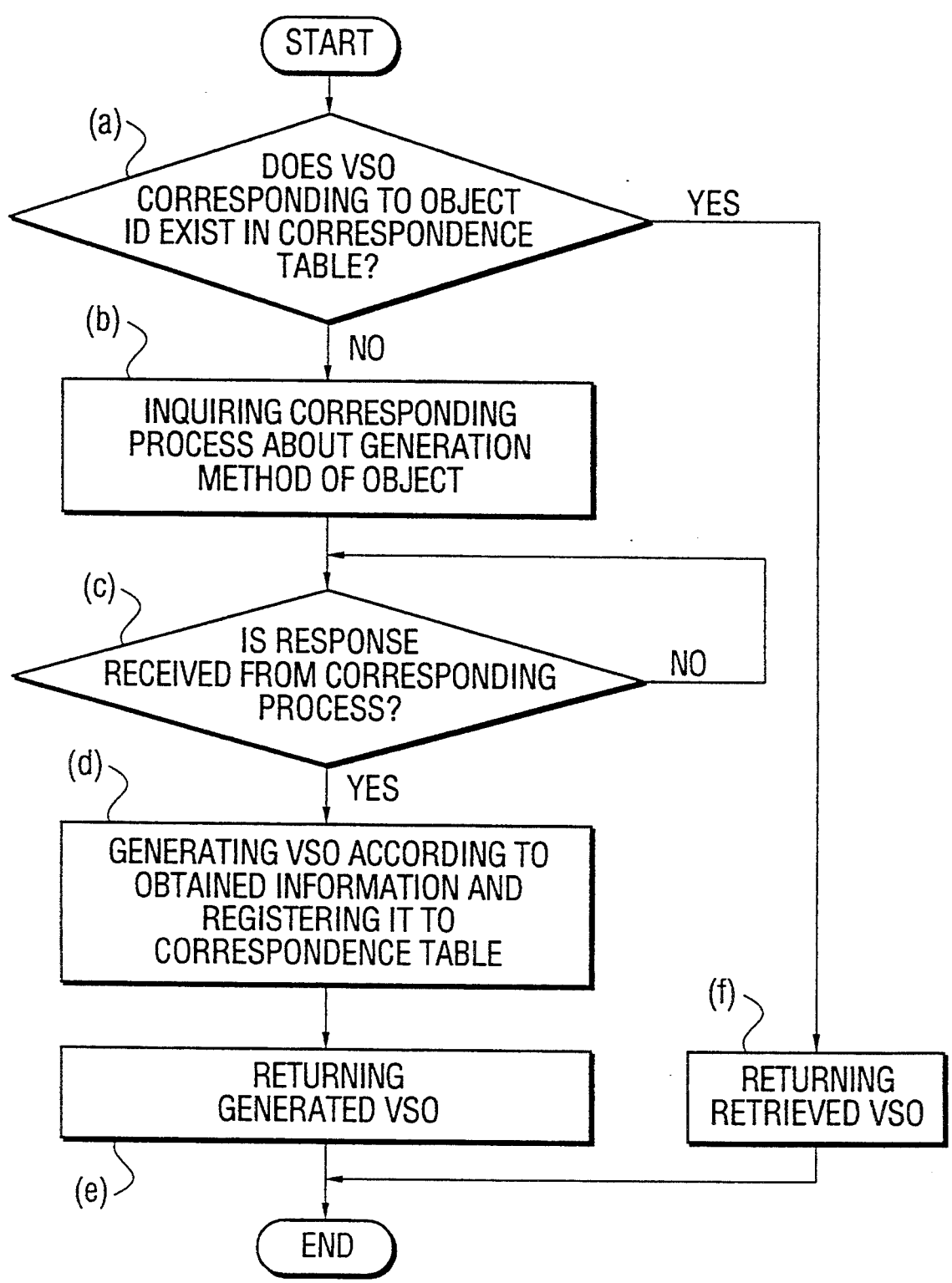

OBJECT-ORIENTED LANGUAGE PROCESSING SYSTEM

BACKGROUND OF THE INVENTION

1. Field of the Invention

The present invention relates to a technology for processing data using object-oriented languages having a concept of a class, an instance, and a method invoke by a message transmission.

2. Description of Related Art

Object oriented programming is currently a popular technique because of its high productivity and ease of reusing parts. In order to further improve the ease of reusing parts, a computer system capable of supporting an object oriented language requires the capability of using in a particular object oriented language an object from any object oriented language, regardless of the internal structure of an object.

Various object oriented languages have been developed, including the C++ languages with object oriented lingual functions attached to the C language, the CLOS with object oriented lingual functions attached to the LISP language, and the Smalltalk developed by the Xerox Corporation of the United States. Although many object oriented languages support varying programming styles and they share a few basic concepts related to object oriented programs, their actual internal data structures are totally different.

Therefore, it has been impossible to use in one language an object written in another language by exchanging messages between objects written in different object oriented languages. Such a use entails a reformatting of the lingual system after analyzing the internal structure of an object, and thus has been extremely difficult.

A feature of an object oriented language is the ease of turning data and procedures into parts by shielding information of various objects. If it is easy to use an object written in one object oriented language in another object oriented language, a use, in various languages, of program parts written in one language further improves a productivity of program development.

SUMMARY OF THE INVENTION

This invention aims at realizing an interface between different object oriented languages and simplifying the use of an object written in one object oriented language by an object written in another.

A feature of this invention resides in realizing an interface among a plurality of different object oriented languages for use in a computer system.

The present invention comprises a server process for operating an object written in a first object-oriented language, a client process for operating another object written in a second object-oriented language and for utilizing the object operated in the server process, and a communications process through a communications path between the server process and the client process.

BRIEF DESCRIPTION OF THE DRAWINGS

One of skill in the art can easily understand additional features and objects of this invention from the description of the preferred embodiments and some of the attached drawings. In the drawings:

FIG. 9 is a flow chart showing executing a method in accordance with the first embodiment of the present invention; and FIG. 10 is a flow chart showing generating an object according to a result of retrieving the correspondence table in accordance with a second embodiment of the present invention.

DESCRIPTION OF THE PREFERRED EMBODIMENTS

Figure 1:
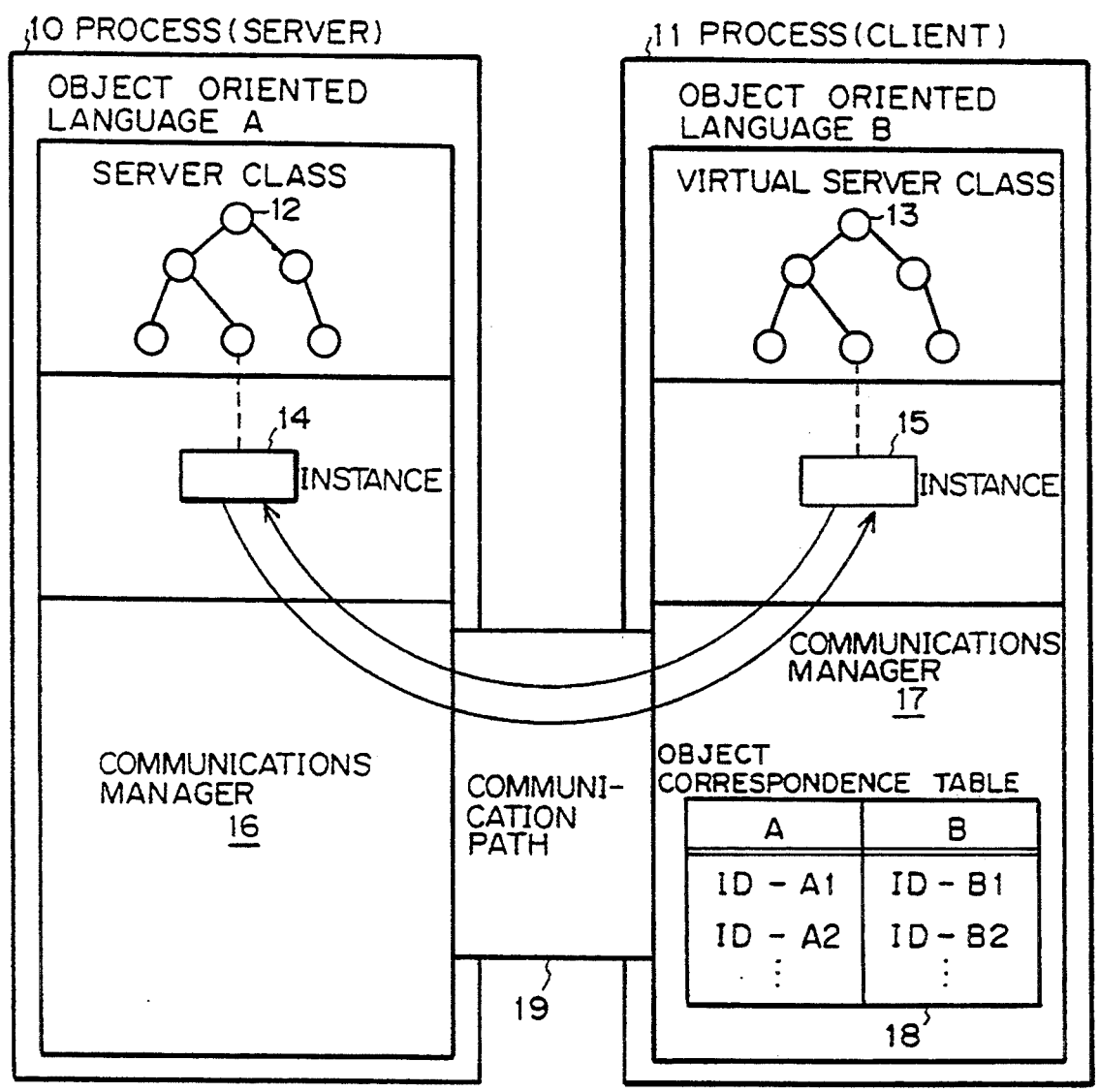
FIG. 1 is a block diagram of a first embodiment of the present invention.

FIG. 1 is a block diagram of a first embodiment of the present invention.

In FIG. 1, 10 and 11 are processes, which are units for acquiring execution resources of a computer or a processing unit of a computer system, 12 is a server class, 13 is a virtual server class defined for other processes in correspondence with the server class 12, 14 and 15 are instances, which are objects having concrete internal values belonging to a class, 16 and 17 are communications managers for performing interprocess communications, 18 is an object correspondence table for managing the correspondence information between an object residing in a home process and one residing in a foreign process, and 19 is a communications path for use in an interprocess communications. In the present invention, it is assumed that an "instance" and an "object" have almost the same meaning.

This invention realizes, in the following manner, an interface among a plurality of different object oriented languages having a concept of a class, an instance and a method of invoking a process by a message emission.

This invention causes objects written in different object oriented languages A and B to operate respectively, in different processes 10 and 11.

The communications managers 16 and 17 are provided, capable of supporting the message exchange between objects in the processes 10 and 11 by interprocess communications. One communications manager 17 manages the object correspondence table 18 showing identifiers by which the other process refers to an object existing in its own process is referred to in the process of the other party, for identifying the other process transmitting a message through the interprocess communications.

When an object written in object oriented language B uses an object written in another object oriented language A, the virtual class 13 (referred to as a virtual server class), corresponding to the class 12 (referred to as a server class) defined in process 10 of the supplier of the object, is defined in process 11 of the user of the object.

The virtual server class 13 corresponds one-to-one to a method defined by the corresponding server class 12 of the supplier, and the virtual server class 13 is provided with another method, that is, a caller, for utilizing the method defined by the server class 12. The method (caller) is structured such that a message is transmitted to the object of the supplier via the communications managers 16 and 17.

Thus, interprocess communications realize an interface between the object oriented languages A and B. Hereinafter, for a simple explanation, the process 10 supplying parts is referred to as a server, and the process 11 utilizing the supplied parts is referred to as a client.

The following method enables a client to generate and operate a server's object by the object operations method offered by the descriptive language, even if the client is written in an object oriented language different from that of the server.

Two components, namely the virtual server class 13 and the communications manager 17, are provided as mechanisms for realizing the interface.

[Virtual Server Class]

The client predefines a class corresponding to every class existing in a server using object oriented language B. Such a class predefined by the client is referred to as a "virtual server class". The structure of a virtual server class 13 is extremely simple, and the following process is performed.

(1) When the instance 15 of the virtual server class 13 is created, the instance 14 of the server's object is generated after the communications via the communications managers 16 and 17.

In the present invention, an object (instance) indicates data and their type, and a class indicates a set of functions and a data type. "Generating an instance (or an object)" in a server and a client indicates reserving a memory area for storing the instance (object) both on the client and the server sides. For instance, a pointer indicating the memory area is used as the above described object identifier (ID).

(2) A "caller" method for using all the methods defined in the corresponding server class 12 is also defined in the virtual server class 13. These methods are virtual ones for transmitting a corresponding message to a server's object through the communications managers 16 and 17. When the client's program emits a message to the virtual server class 13 or its instance 15, thereby invoking such a method, interprocess communications are performed such that the method of an object existing on the server side is actually executed.

[Communications Manager]

The communications managers 16 and 17 existing in the server and the client, respectively, are invoked in a manner such as a call of a function or a subroutine to perform the following processes.

(1) The communications managers 16 and 17 generate communications data instructing a generation of an instance and an invoking of a method, and emit them to a server or client.

(2) The communications managers 16 and 17 receive communications data emitted from a server or a client, interpret them and execute them.

(3) The communications managers 16 and 17 control the object correspondence table 18 for managing by which identifier (ID) an object existing in one process is referred to in the other process.

By so doing, a client program treats a server's object as a virtual server class 13 or its instance 15, thereby a client program can treat it exactly the same as an ordinary object.

That is, a client's program can use a server's object without ever recognizing in which object oriented language the server's object is written.

As described above, an ordinary system is such that a client uses a function supplied by a server. However, a system can be such that a client and a server are in an arms-length relation. That is, this invention is also applicable to a case in which a server concurrently uses a client's function. In this case, the server is provided with an object correspondence table.

Figure 2:
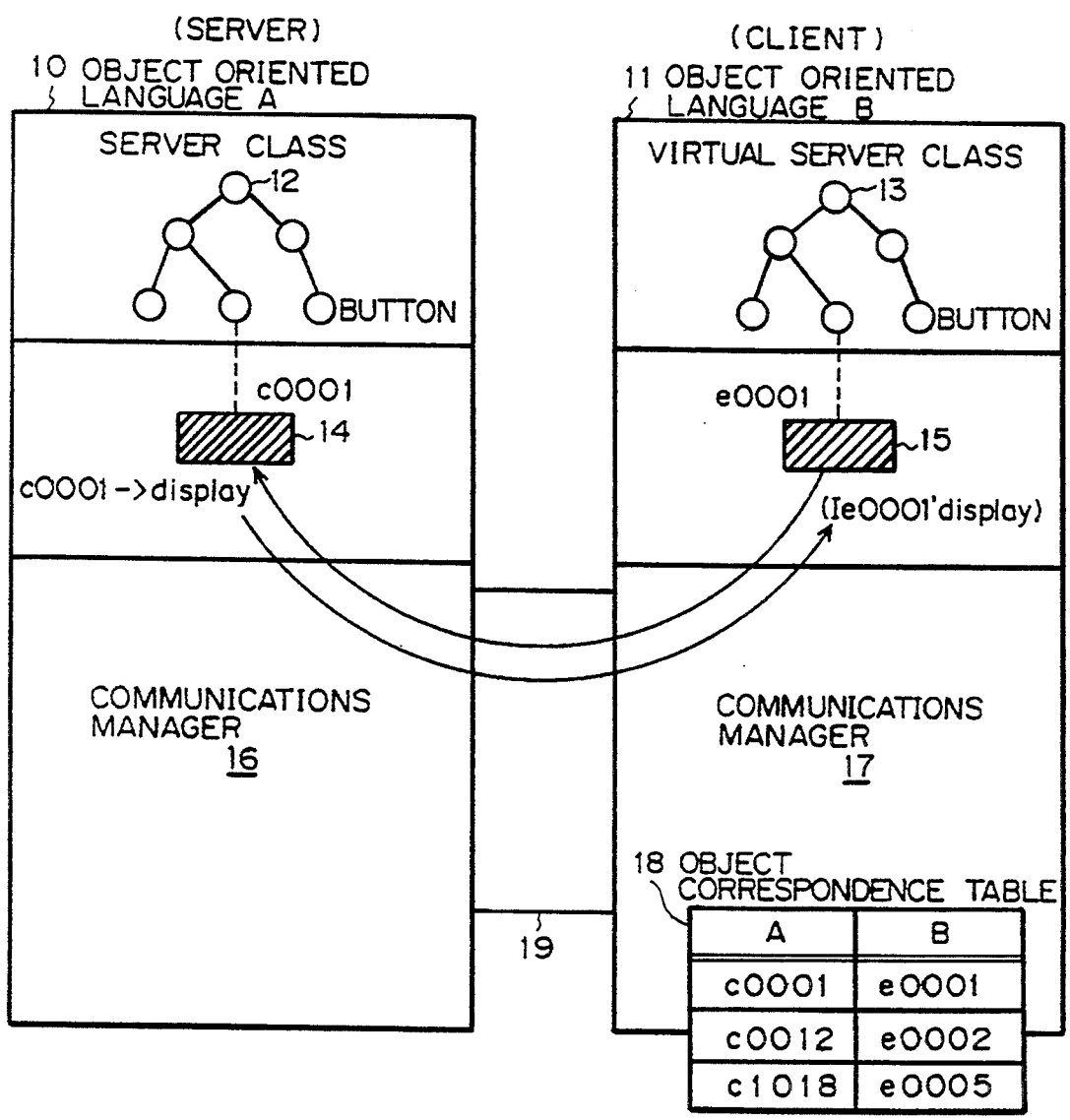
FIG. 2 is an explanatory chart for the first embodiment of the present invention.
Figure 3:
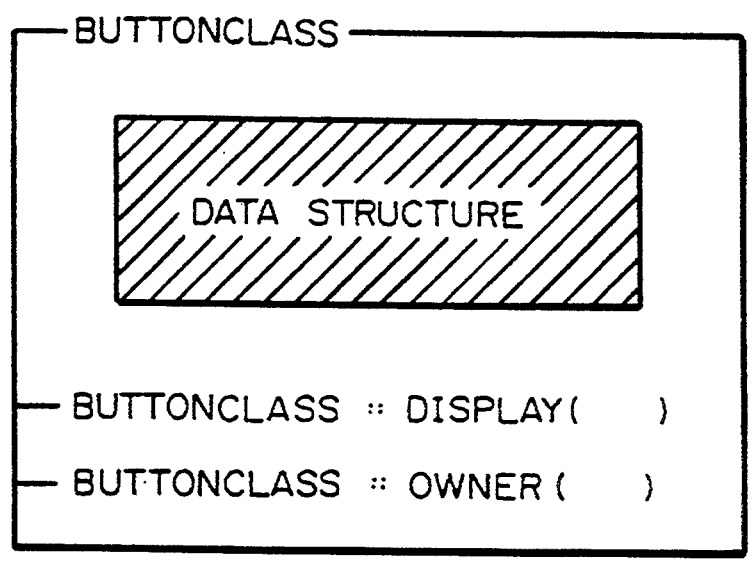
FIG. 3 is a diagram used to explain a button class in accordance with the present invention.

FIG. 2 is an explanatory chart for an embodiment of this invention; and FIG. 3 is a view for explaining a button class.

A case is explained by referring to FIGS. 2 and 3 in which object oriented language B (different from object oriented language A) uses a "button object", which is one of parts of a man-machine interface (MMI) written in object oriented language A (e.g. the C++ language). In this case, a process written in C++ is a server and the process written in object oriented language B is a client.

A class normally indicates a set of functions and a data type. In FIG. 3, the button class is an embodiment of a class, and indicates the data structure of the class and various functions, for example, a function DISPLAY for indicating a button on the display screen, and a function OWNER for indicating an object name to which the button belongs.

In FIG. 2, the server can be provided with an object correspondence table which allows the client's object to be used by the server.

Next, the operation of the embodiment shown in FIG. 2 is explained.

(1) To use a man-machine interface part of object oriented language A, the virtual server class 13 is loaded on the system of object oriented language B.

(2) The server is invoked and the communications path 19 for interprocess communications is established.

(3) An instance 15 of the "button" class defined as the virtual server class 13 of object oriented language B is generated. That is, a memory area is reserved. At this time, the syntax of object oriented language B is used "as is", however, a generation of instance 15 and that of corresponding instance 14 in object oriented language A may be called by a plurality of operations.

(4) The communications manager 17 of a client receives from, for example, a function NEW for generating a client's button object, an instruction to issue a request to generate instance 14 in object oriented language A corresponding to instance 15 in object oriented language B.

(5) The communications manager 17 of a client emits a message instructing the server to generate instance 14 by interprocess communications, and the server generates an object on receiving the message. At this time, the communications manager 16 of the server generates an ID for recognizing the object and notifies the client.

(6) The communications manager 17 of the client registers the ID and the corresponding object of object oriented language B, i.e., instance 15, in the object correspondence table 18, thereby allowing a subsequent search. The object correspondence table 18 may register an object name itself or a pointer. The server also holds such a correspondence table if necessary. Then, control returns to the function NEW which issued a request to generate a client's button object.

(7) Suppose that a "display" message for displaying it on a screen is emitted, for example, for a button object of object oriented language B thus generated. The format for the message emission uses the syntax of object oriented language B "as is".

(8) A client's "display" method (caller) thus invoked instructs the communications manager 17 to emit a "display" message to the corresponding server of object oriented language A. Here, the method name defined in the server class 12 need not be the same as the method name defined in the virtual server class 13. It is sufficient that the method names have a correspondence, so that the communications manager 17 can correctly transmit a message. At the transmission, the contents of the object correspondence table 18 are referred to.

(9) The communications managers 16 and 17 perform interprocess communications, thereby invoking the "display" method of the server's button object, and the button is displayed on the screen. The successful display is notified to the client, and control is returned to the sender of the message ("display") on the client side.

(10) When a user of the application program operated on the client side pushes a button, object oriented language A senses this and causes a predetermined message notifying that a button is pushed through the communications manager 16 of the server to be transmitted to the client.

(11) In response to the predetermined message, the communications manager 16 of the server transmits a message, for example, indicating the time when the button is pushed, to the object of object oriented language B through the communications manager 17 of the client.

(12) Suppose that an "Owner" message is transmitted to the client's button object. The "Owner" message is issued to obtain the name of an object to which the button belongs.

(13) On receiving the "Owner" message, the client's button object transmits an "Owner" message to the server's button object. At this time, the contents of the object correspondence table 18 are referred to for a corresponding object of the server. The communications format can be of any type regardless of the argument of a function OWNER. That is, it does not matter, for example, how the coordinates of a button are encoded, and then decoded on the server side, etc.

(14) The server's button object processes the "Owner" message and returns, for example, an identifier of an object to which the button belongs. The result is transmitted to the client through the communications manager 16.

(15) On receiving the result, the client converts the object identifier (ID) of the server to the object ID of the client according to the object correspondence table 18 to return it to the sender of the message.

Thus, the client doesn't take any practical actions in response to the "Owner" message, but the server does. For example, even though the client and the server share the same function name OWNER, the client's function calls the server's Owner subroutine and returns the answer to the message sender. The server's function practically searches for an object to which the button belongs, and returns the object's identifier or name (label) to the client.

(16) When all the button objects are eliminated, the following procedure is taken. A message for destroying the button object of object oriented language B is emitted. The format of a message emission uses "as is" the syntax of object oriented language B.

(17) The communications manager 17 performs interprocess communications, thereby instructing the server to destroy the button object. If it succeeds, the entry of the object is deleted from the object correspondence table 18 held by the client.

(18) When all functions of the server become unnecessary, the server process is erased, thereby deleting the communications path 19.

Described below as concrete examples of an object described in different object oriented languages are a description of a button object in the C++ language, and a description of a button object in the Smalltalk.

```
[button object description by the C++ language]
/*an example of defining a button class by C++*/
class Button :public Interactor {
public:
        void display ( );//procedure for displaying a button
        void pressed (Point* p); //processing when a button
is pressed
        . . .
}
/*a description for displaying a button*/
Button* b;
b = new Button( );
b → display( );
[button object description by the Smalltalk]
"an example of defining a button class using
Smalltalk"
        class name Button
        super class Interactor
        instance methods
        displayControl
            display
            . . .
        callback
            pressed:point
        . . .
"description of displaying a button"
        b ← Button new.
        b display
```

As described above, a different object oriented language has a different way of description, such as a syntax. For instance, assume that the description in the C++ language is a server part and that the client is described in the Smalltalk. As in the above example, the object corresponding to the button object in the C++ language is described also in the Smalltalk. In this case, the object of the Smalltalk is a virtual server class.

The method collateral to the server class described in the C++ language is a procedure for performing an actual process. The method collateral to the virtual server class of the client is a procedure for sending a message to the corresponding server class through the communications manager 16.

FIGS. 4 through 10 explain the flow of processes related to the communications managers 16 and 17 in the preferred embodiment of this invention. The communications managers 16 and 17 have various processing functions such as follows and are called up like a subroutine from the application program.

Figure 4:
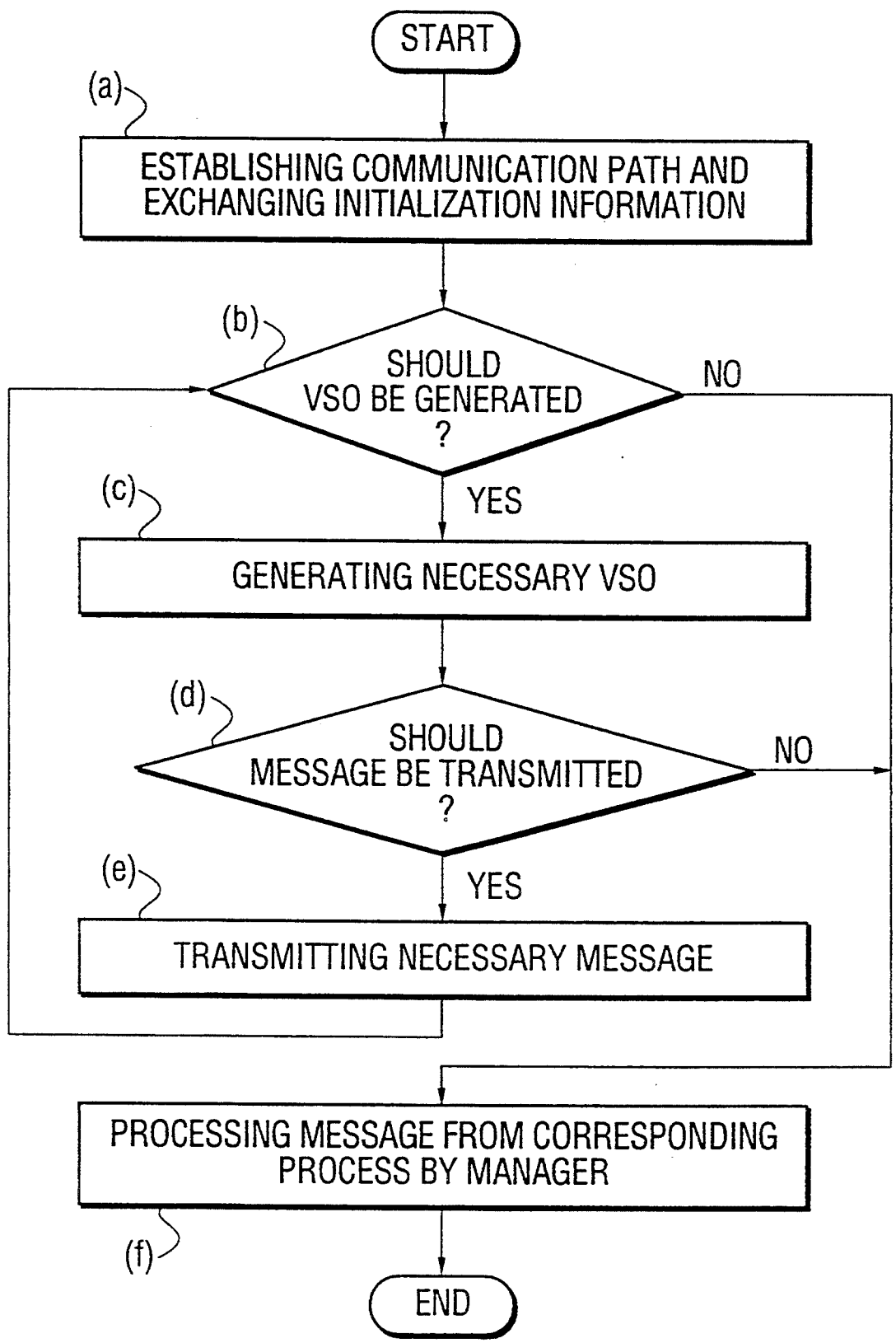
FIG. 4 is a flow chart showing a process executed mainly by a communications manager in accordance with the first embodiment of the present invention.

FIG. 4 shows the structure of a main program mainly executed by the communications managers 16 and 17.

(a) through (f) in the following explanation correspond to the processes (a) through (f) shown in FIG. 4.

(a) A communications path 19 is set up and initialized for exchanging necessary information between processes. For example, the information comprises an object list generated by the server, class names used in generating objects, etc.

(b) By exchanging the initial information, it is judged whether or not the instance (hereafter referred to as virtual server object (VSO) of the virtual server class 13 is necessary. If it is not necessary, proceed to processing (f).

(c) When VSO needs to be generated, the VSO is generated. A class name received from a corresponding process is used in generating a VSO. Accordingly, a VSO can be generated by a publicly-known method only if a class name is given.

(d) It is judged whether a message emission is necessary after generating the VSO so that the objects of both processes can be the same. If it is not necessary, proceed to processing (f).

(e) When a message emission is necessary, the message is emitted to the other process. Then, revert to processing (b).

Figure 7:
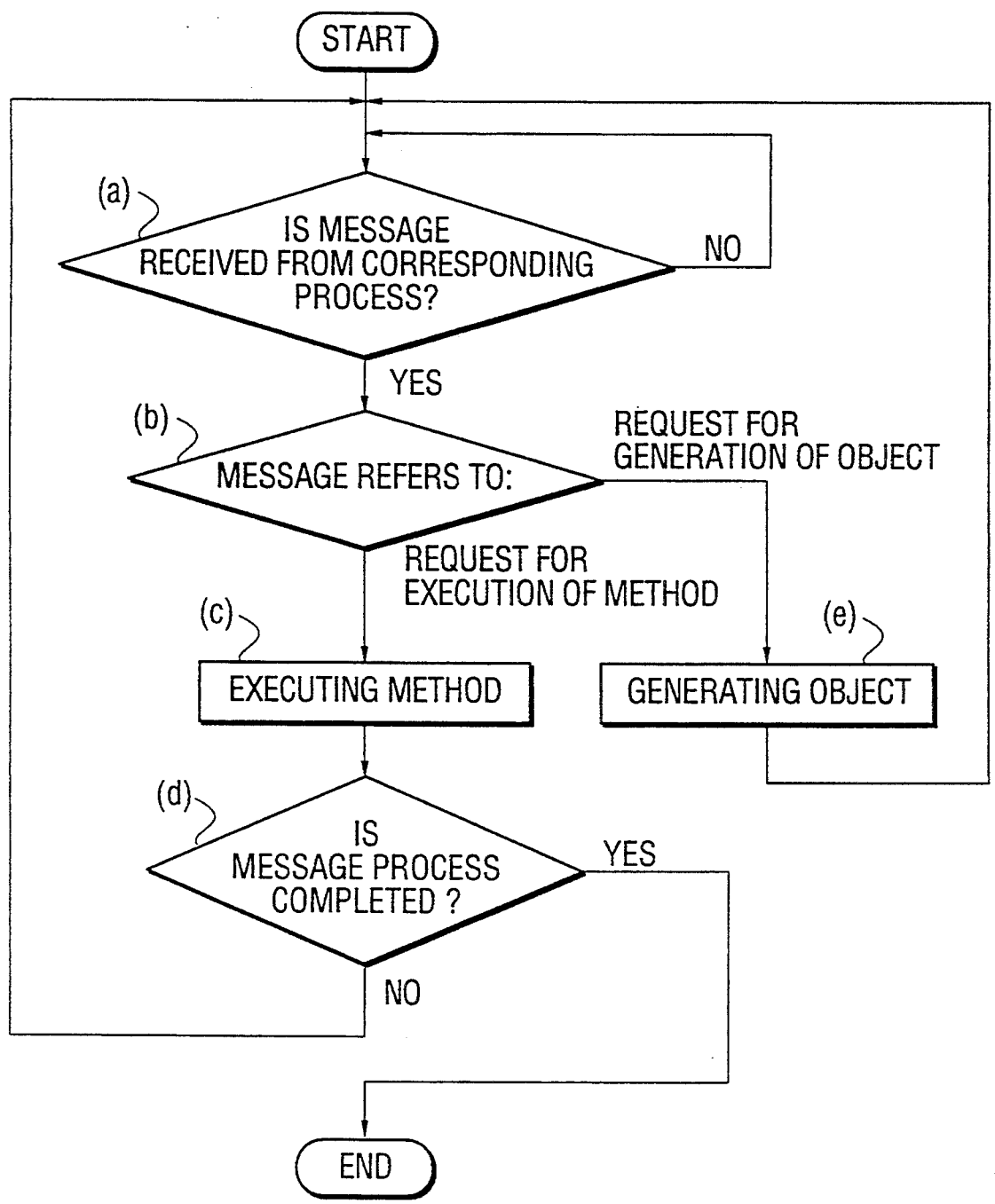
FIG. 7 is a flow chart showing processing of a message received from an other process by a communications manager in an embodiment of this invention.

(f) When neither the VSO generation nor the message emission is necessary, the communications managers 16 and 17 process a message from the other process and initiate a service. That is, the process explained in FIG. 7 is initiated.

Figure 5:
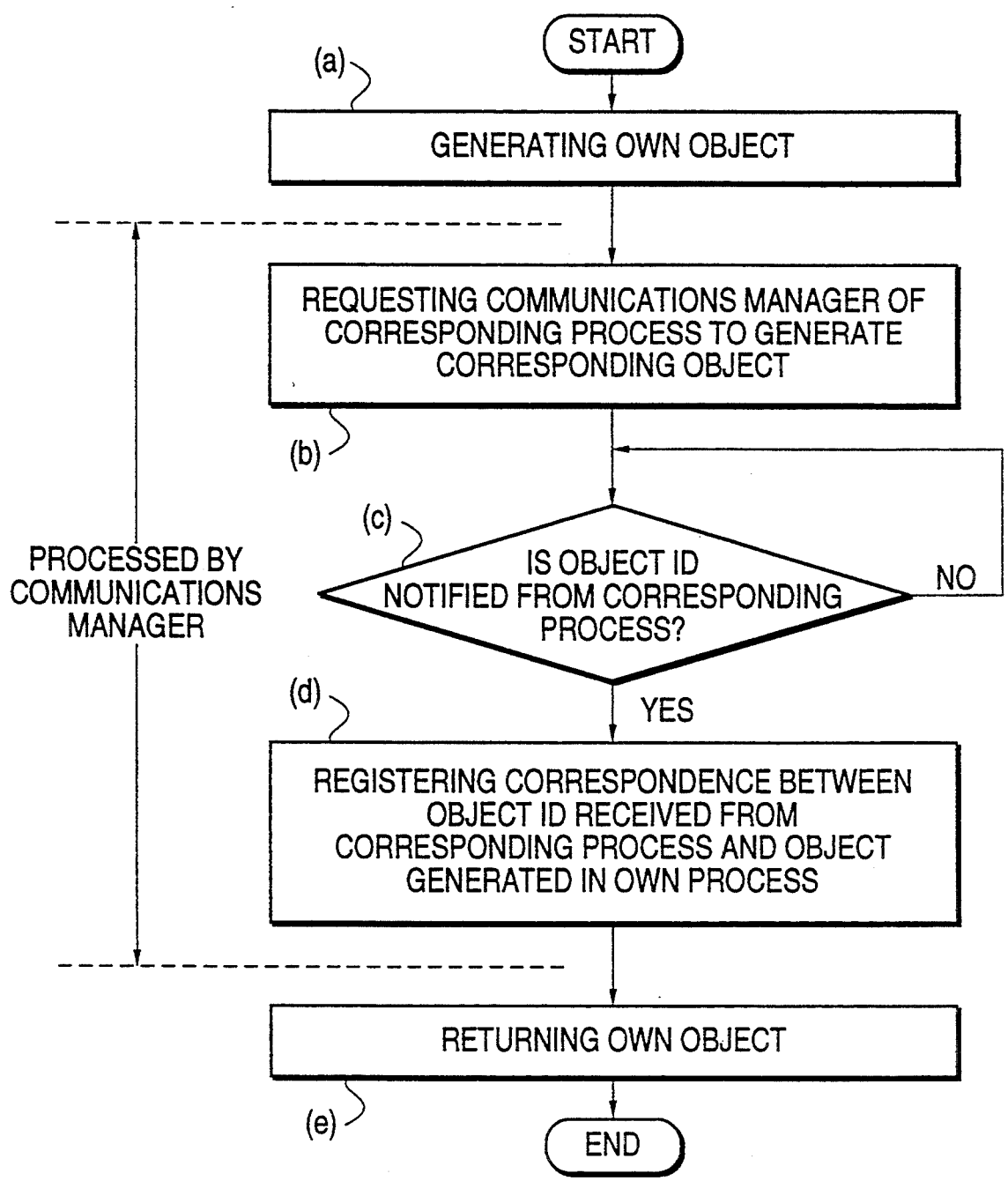
FIG. 5 is a flow chart showing a process of generating an instance by virtual server class in accordance with the first embodiment of the present invention.

FIG. 5 is a flow chart showing generating an instance of a virtual server class in accordance with the preferred embodiment of this invention. The following is a description of the flow chart in FIG. 5.

(a) The object of this process, that is, an instance as a VSO, is generated. It is generated after reserving a necessary memory area as described above.

(b) A communications manager 17 requests the communications manager 16 of the other process to generate a corresponding object.

(c) Stand by for the notification of an object ID from the other process.

(d) When the other process notifies the object ID, the correspondence information between the notified object ID and the object generated in the own process are registered in the object correspondence table 18.

(e) Return the object of the own process, that is, the instance is returned to the sending program.

Figure 6:
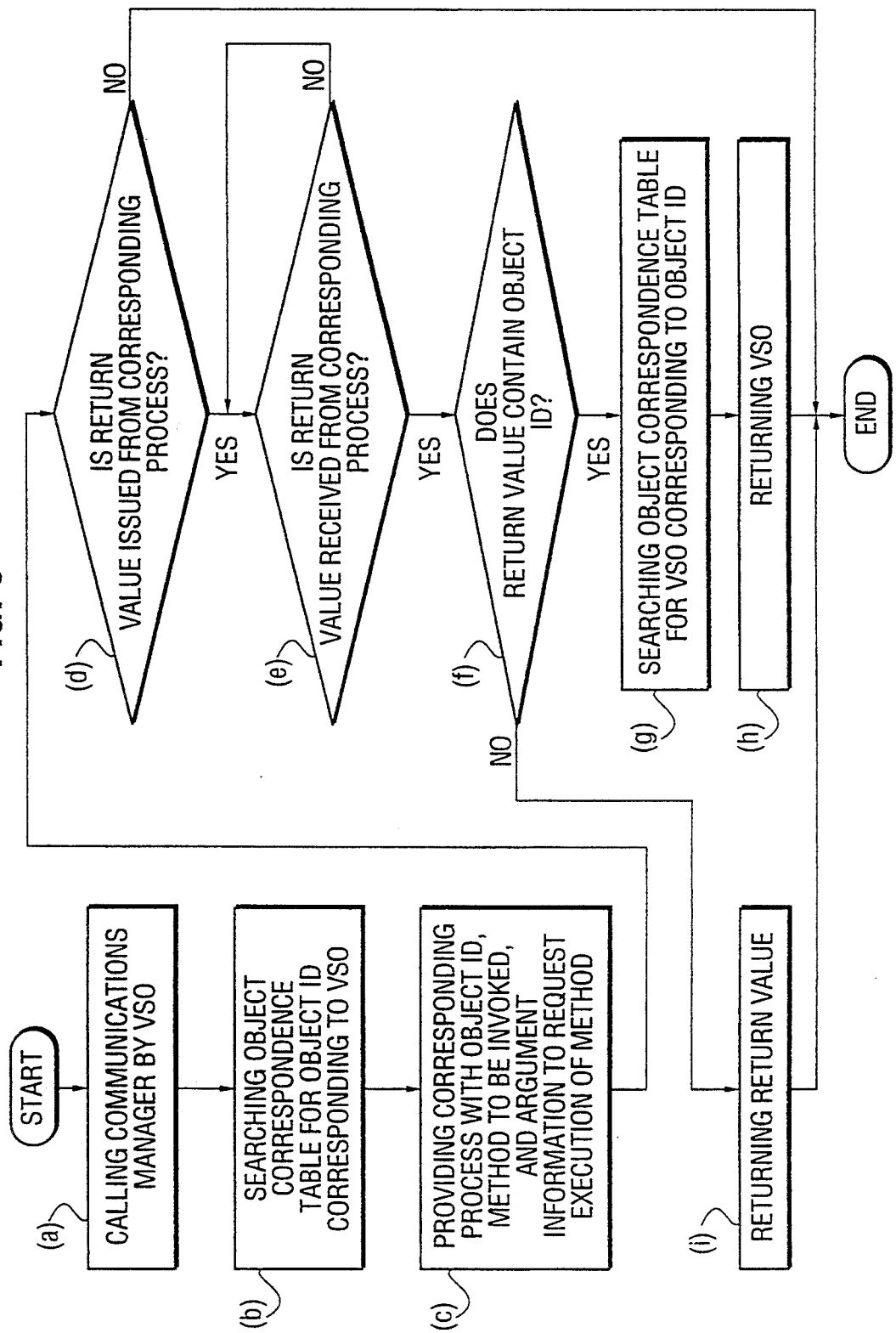
FIG. 6 is a flow chart showing processing a message transmitted to an instance by a virtual server class in accordance with the first embodiment of the present invention.

FIG. 6 is a flow chart showing transmission of a message to an instance of a virtual server class according to the preferred embodiment of this invention. The following is its description of the flow chart in FIG. 6.

(a) An instance (VSO) of a virtual server class calls up the communications manager 17.

(b) By searching the object correspondence table 18, the object ID corresponding to a VSO is obtained.

(c) Supply to the other process, an object ID, a method to be invoked (for example, "display", "owner", etc. described above), and argument information (for example, a button display position), and request a method execution.

(d) Check whether there is a return value from the other process. Terminate the process when there is none.

(e) When there is a return value, wait for a return value from the other process.

(f) On receiving the return value, check whether the return value includes an object ID. If it does not, proceed to processing (i). If it does, proceed to processing (g).

(g) When the return value includes an object ID, search the object correspondence table 18 and obtain the VSO corresponding to the object ID.

(h) Return the VSO, that is, return the instance to the sender on the client side, and end the process.

(i) When the return value does not include an object ID (for example, button display position coordinates), turn back the return value "as is".

FIG. 7 is a flow chart showing processing of a message received from the other process by a communications manager in accordance with the preferred embodiment of this invention. The following is a description of the flow chart in FIG. 7.

(a) Stand by for an arrival of a message from the other process. Upon its receipt, proceed to the next processing.

(b) Judge whether the content of a message is a request for executing a method or a request for generating an object (for example, a request made to a server when a client's object is to be generated). If it is a request for execution, proceed to processing (c). If it is a request for generation, proceed to processing (e).

(c) Execute a method.

(d) Revert to processing (a) until the message is completely processed according to a special message "Quit" indicating the termination of the process of a message, and continue processing the next message.

(e) Create an object in response to a request for an object generation. Then, revert to processing (a) and stand by for the next message.

Figure 8:
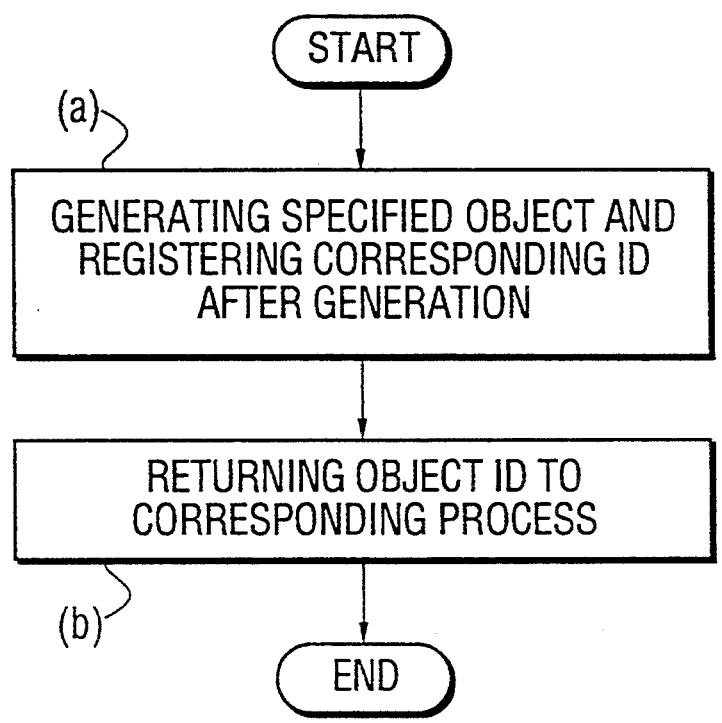
FIG. 8 is a flow chart showing generating an object in accordance with the first embodiment of the present invention.

FIG. 8 is a flow chart showing generation an object in accordance with the preferred embodiment of this invention. The following is a description of the flow chart in FIG. 8.

When an object is generated shown as processing (e) in FIG. 7, processings (a) and (b) shown in FIG. 8 are executed.

(a) Generate a specified object, for example, an instance 14 (C0001) shown in FIG. 2, create a corresponding ID, and register them in the object correspondence table 18. Usually, the ID is a pointer indicating an area reserved for the object. However, when the object cannot be referred to by the pointer value, a label, etc. assigned to the object can be used instead.

(b) Return an object ID of the generated object to the other process.

When a method is executed as processing (c) shown in FIG. 7, processings (a) through (f) shown in FIG. 9 are executed.

(a) Search the object correspondence table 18 for objects specified by every object ID included in a message.

(b) Call a specified method of a specified object using a specified argument.

(c) Check whether a return value exists or not. If there is none, terminate the method execution.

(d) Check the return value. If the return value is an object, execute processing (f). Otherwise, execute processing (e).

(e) If a return value is not an object, turn back the return value "as is".

(f) If a return value is an object, turn back the return value by converting it to a corresponding object ID.

According to the above system, when an object is generated by one of the processes, communications must take place and the other process also generates an object. However, because an object having a meaning in only one of the processes exists, it is inefficient to generate all objects contemporaneously in both processes.

Therefore, in the second embodiment described below, when a message sent from the other process contains an identifier of an unknown object, the corresponding object is generated dynamically.

By providing in an object a function of making an inquiry about a class, when an unknown object ID appears in a communications message, the object is generated in its home process in the second embodiment. Therefore, an object not appearing in communications, i.e. an object having a meaning in only one of the processes 10 and 11, no longer needs to be shared simultaneously by both of them.

In an interlingual association using a virtual server class 13 shown in FIG. 2, a module of the communications manager 17 comprises the object correspondence table 18 having correspondence information between a server's object (ID) and a client's object. When an object is generated on the client side, an entry for the object correspondence table 18 is generated. This is changed as follows.

(1) The communications manager 17 checks whether or not an unknown object exists among messages from the other process, and if yes interrogates the other process about the method for generating it.

(2) The communications manager 17 generates an instance and an entry of the object correspondence table 18 pursuant to the returned information for the generation and continues processing a message.

In the above described flow, the process shown in FIG. 5 is executed by the client, and the process (a), (b) and (c) shown in FIG. 7 and FIG. 8 is executed by the server for "b-Button new" indicating the display of a button by the above described Smalltalk program. For "b display", the process shown in FIG. 6 is executed by the client and the process (a)-(c) shown in FIG. 7 and FIG. 9 is executed by the server.

The following is a description of a procedure in which the communications manager 17 of the client interprets and executes a message emitted from the server.

(1) On receiving a message, a token building a massage is extracted by analysis. A token is a unit of data having meaning in a message.

(2) When a token is an object ID and it does not exist in the correspondence table 18 having correspondence information between the server object and the client object, the server is requested to notify the object class. Otherwise, an ordinary token processing is performed.

(3) A server notifies the client of the class name or the class ID. In this example, although the class information is treated as an object generating information, the object generation information need not necessarily be class information.

(4) On its receipt, the instance 15 is created for the corresponding virtual server class 13 and written into the object correspondence table 18.

(5) Next token processing is performed.

By so doing, the efficiency of executing a program using an interface between object oriented languages can be raised.

FIG. 10 is a flow chart showing a process of the object generating system according to the result of searching the object correspondence table 18 in accordance with the second embodiment of the present invention.

(a) through (f) in the following explanation correspond to processings (a) through (f) shown in FIG. 10.

(a) When a message has an object ID, search the object correspondence table 18 for the VSO corresponding to the object ID. If it exists, proceed to processing (f).

(b) When the VSO corresponding to an object ID does not exist in the object correspondence table 18, make an inquiry to the other process about the method for generating the object, such as the class name of the object and the class ID.

(c) Stand by for a response from the other process. On receiving a response, proceed to the next step.

(d) Create a VSO based on the information obtained from the response, and register the correspondence information between the object ID and the VSO in the object correspondence table 18.

(e) Turn back the generated VSO and terminate the process.

(f) When the VSO had already existed in the object correspondence table 18, turn back the searched VSO and end.

As described above, this invention makes it possible to write a program by using "as is" the syntax and function supported by any object oriented language, when a program written in a different object oriented language provides a part defined as an object.

This greatly enhances the program development productivity through easy adoption of program parts from various other languages, because a programmer need not learn a special syntax or function in using parts written in a different object oriented language without understanding the internal structure of a corresponding object as long as he (or she) is well familiar with message interfaces, and he can use exactly the same system as when he uses a part written in the object oriented language of his choice.

This also boosts the efficiency in executing a program for use in an interface between object oriented languages through a virtual server class by generating a dynamically corresponding object by requesting information required to generate create an object on receiving a notification of an unknown object, instead of having the client keep the same object as the server.

Thus, the present invention can be applicable in all industries utilizing computer systems operated by object-oriented languages.

What is claimed is:

1. A method for realizing an object-oriented language interface in a digital computer system, comprising:

performing a server process for operating a first object written in a first object-oriented language, said performing a server process including, operating a server class written in said first object-oriented language, and operating a communications manager for managing communications with a client process;

performing a client process for operating a second object written in a second object-oriented language, said performing a client process including, operating a virtual server class defining a method corresponding to a method defined in said server class to utilize said method defined in said server class, operating an object correspondence table for storing information indicating a correspondence between said first object operated in said server process and said second object operated in said client process, and operating a communications manager for manager for managing communications with said server process;

establishing a communications path between said server process and said client process; and performing a communication process through said communications path between said server process and said client process enabling said client process to utilize said first object.

2. The method according to claim 1, wherein said step of establishing a communications path between said server process and said client process comprises:

exchanging initialization information between said server process and said client process;

determining, according to said initialization information in said client process, whether or not an instance of said virtual server class must be generated;

generating said instance of said virtual server class if it is determined that an instance of said virtual server class must be generated;

determining, when said instance is generated, whether or not a message must be transmitted to said server process;

transmitting said message if it is determined that a message must be transmitted to said server process; and processing a message received by said client process from said server process and a message received by said server process from said client process if said instance need not be generated or said message need not be transmitted to said server process.

3. The method according to claim 2, wherein said generating said instance of said virtual server class comprises:

generating, in said client process, an instance of said virtual server class as an object of said client process;

requesting, through said communications manager, that said server process generate an instance as an object corresponding to the object of the client process;

monitoring whether or not said server process notifies said client process of an object identifier identifying the corresponding object generated by the server class;

registering, in said object correspondence table, a correspondence between said notified object identifier and the instance of said virtual server class as an object of the client process; and returning said instance of the virtual server class and terminating the process.

4. The method according to claim 2, wherein said processing a message transmitted to an instance of said virtual server class comprises:

said instance of said virtual server class calling said communications manager;

said communications manager searching said object correspondence table for an object identifier corresponding to said instance of said virtual server class;

assigning to said server process an object identifier, a method to be invoked, and argument information;

requesting said server process execute a method;

determining whether or not said client process receives a return value from said server process;

terminating the process when no return values are received;

determining, when said return value is received, whether or not said return value contains an object identifier;

returning said return value and terminating the process if said return value contains no object identifier;

searching, if said return value contains said object identifier, said object correspondence table for an instance of said virtual server class corresponding to said object identifier; and returning said instance and terminating the process.

5. The method according to claim 2, wherein said processing a message received from a corresponding process comprises:

monitoring whether or not a message is received from a corresponding process;

determining whether said message requests generating an object or executing a method;

generating an object when said message requests generating an object;

executing a method when said message requests executing a method;

determining whether or not a message process is completed; and terminating the process if the message process is terminated.

6. The method according to claim 5, wherein said object generating process comprises:

generating a specified object and registering an object identifier corresponding to the specified object in said object correspondence table;

returning said object identifier to a corresponding process; and terminating the current process.

7. The method according to claim 5, wherein said method executing process comprises:

searching said object correspondence table for an object specified by all object identifiers contained in a message;

calling a specified method of said specified object by a specified argument;

determining whether or not a return value exists;

terminating the current process if a return value does not exist, determining, if a return value exists, whether or not said return value indicates an object;

returning said return value if it does not indicate an object and terminating the current process;

converting said return value, if said return value indicates an object, to an object identifier; and returning said identifier and terminating the current process.

8. The method according to claim 6, wherein said object generating process based on the result of the search in saint object correspondence table comprises:

determining whether or not an instance of said virtual server class corresponding to an object identifier in a message exists in said object correspondence table;

returning a retrieved instance when it exists in said object correspondence table and terminating the current process;

interrogating a corresponding process about the method of generating said object if said instance does not exist in said object correspondence table;

monitoring a response from said corresponding process;

generating said instance of said server class, if said response is received, according to the information in said response and registered in said object correspondence table; and returning said instance and terminating the current process.

9. The object-oriented language interface realizing method according to claim 1, wherein said server process is provided with an object correspondence table for storing correspondence information between an object operated in its own process and one operated in said client process so that it can exchange functions with said client process to utilize an object operated in said client process.

10. An object-oriented language processing system, comprising:

a server processing means for operating a first object written in a first object-oriented language, said server processing means including, a server class operating means for operating a server class written in said first object oriented language, and communications managing means for managing communications with a client process;

a client processing means for operating a second object written in a second object-oriented language said client processing means including, a virtual server class operating means for operating a virtual server class defining a method corresponding to a method defined in said server class to utilize said method defined in said server class, and an object correspondence table for storing information indicating a correspondence between said first object operated in said server process and said second object operated in said client process, and a communications manager for managing communications, with said server process;

a communications path establishing means for establishing a communications path between said server process and said client process; and means for performing a communication process through said communications path between said server process and said client process enabling said client process to utilize said first object.

11. The object-oriented language processing system according to claim 10, wherein said communication means converts an identifier of said second object to an identifier of said first object and vice versa.

12. An object-oriented language processing system according to claim 10, wherein an object-oriented language that describes said first object is different from an object-oriented language that describes said second object.

* * * * *

UNITED STATES PATENT AND TRADEMARK OFFICE
CERTIFICATE OF CORRECTION

PATENT NO. : 5,450,583
DATED : Sep. 12, 1995
INVENTOR(S) : Yutaka Inada

It is certified that error appears in the above-indentified patent and that said Letters Patent is hereby corrected as shown below:

Column 2, line 11, after "processing" insert --of--; and line 53, "operate" should be --operate,--.

Column 3, line 44, "above de-" should be --above-de--.

Column 7, line 52, delete "its" and insert --a--.

Column 9, line 14, change "i.e." to --i.e.,--.

Column 11, line 4, delete "for manager".

Column 12, line 61, "saint" should be --said--.

Column 14, line 2, "language" should be --language,--; and

UNITED STATES PATENT AND TRADEMARK OFFICE
CERTIFICATE OF CORRECTION

PATENT NO. : 5,450,583

DATED : Sep. 12, 1995

INVENTOR(S) : Yutaka Inada

It is certified that error appears in the above-indentified patent and that said Letters Patent is hereby corrected as shown below:

Column 14, line 15, "nications," should be --nications--.

Signed and Sealed this

Twenty-third Day of January, 1996

Attest:

BRUCE LEHMAN

*Attesting Officer*  *Commissioner of Patents and Trademarks*